(No Model.)

H. C. STONE.
SEWING MACHINE PRESSER FOOT.

No. 260,061. Patented June 27, 1882.

Witnesses.
S. N. Piper
E. S. Pratt

Inventor,
Henry C. Stone
by R. H. Eddy atty.

UNITED STATES PATENT OFFICE.

HENRY C. STONE, OF NATICK, MASSACHUSETTS.

SEWING-MACHINE PRESSER-FOOT.

SPECIFICATION forming part of Letters Patent No. 260,061, dated June 27, 1882.

Application filed March 27, 1882. (No model.)

*To all whom it may concern:*

Be it known that I, HENRY C. STONE, of Natick, in the county of Middlesex, of the State of Massachusetts, have invented a new and useful Improvement in Sewing-Machine Pressers; and I do hereby declare the same to be described in the following specification and represented in the accompanying drawings, of which—

Figure 1:
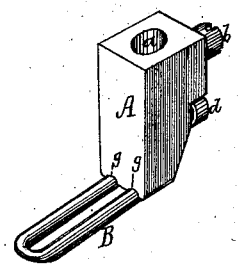
Figure 2:
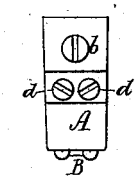
Figure 6:
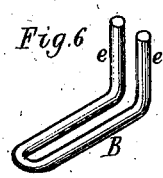
Figure 7:
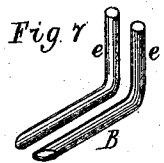
Figure 3:
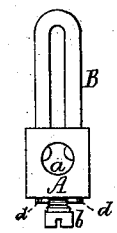
Figure 4:
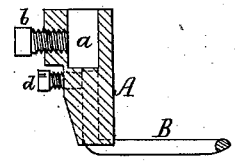

Figure 1 is a perspective view, Fig. 2 a rear elevation, Fig. 3 a top view, Fig. 4 a longitudinal section, and Fig. 5 a transverse section, of a presser-foot embracing my invention, the nature of which is defined in the claims hereinafter presented. Fig. 6 is a perspective view of a closed presser-foot bearing, while Fig. 7 is a perspective view of an open presser-foot bearing, constituting part of my invention.

So far as I have been able to ascertain it has heretofore, excepting in the case of the presser-foot shown in the United States Patent No. 230,580 and Reissue No. 8,865, been customary to make in one piece with the body the prongs or bearing part or parts of a sewing-machine presser-foot, in consequence of which, when such bearing part, or either prong of it, became broken, as occasionally occurs, the presser-foot has been rendered useless for its purpose, or as so much waste material, and a new or perfect one had to be substituted for it.

My invention is designed to enable a person to utilize the body of the presser-foot after such an accident, and for the accomplishment thereof I make the body and bearing part or prongs in separate pieces or parts and socket the body, and provide it with clamp-screws or devices to secure to it the removable bearing part or parts, the said bearing part or parts being provided with a projection or projections to enter the socket or sockets of the body.

In the drawings, A denotes the body of a presser-foot, which, as usual, is provided with a main socket, $a$, to receive the ordinary support bar or rod. It also has to such socket a clamp-screw, $b$, to confine the said body to the said rod. Besides such appliances, the said body is represented as having two auxiliary sockets, $c$ $c$, extended upward within it from and opening out of it at its lower end, there being to each auxiliary socket (which is a cylindrical hole) a clamp-screw, $d$, and such screw being secured laterally into the body and arranged with the socket in manner as represented.

The bearing part or parts B of the presser may be made of steel or metallic wire, and shaped as shown in Fig. 6, in which it is represented as a staple having each prong bent up at a right angle; or it may consist of two separate prongs, as shown in Fig. 7, each of them being bent at a right angle, as indicated in the said figure. The parts $e$, so turned upward, are to enter the auxiliary sockets and to be held in place therein by their clamp-screws.

From the above it will readily be seen that in case of injury to or breakage of a prong or bearing part of a presser-foot of my improved construction, such prong or bearing part can readily be removed and another or perfect one substituted without rendering the body useless. Besides this, the bearing part may be adjusted higher or lower in the body to adapt the presser to cloths varying in thickness; or when two separate prongs, as shown in Fig. 7, are used with the body one may be adjusted to an altitude a little higher or lower than the other; or they, instead of being arranged parallel to each other, may be disposed so as to be slightly divergent relatively to one another. It occasionally happens that such arrangements of the prongs are desirable, all of which cannot be effected when they are in one piece with the body.

Figure 5:
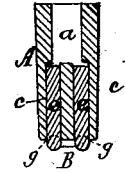

In order to support the bearing part or parts and prevent such from getting out of place laterally, there is made in the foot of the body two notches, $g$ $g$, as shown in Figs. 1 and 5. The prongs enter such notches, and by them are held from getting out of parallelism when both are in one horizontal plane.

I do not claim a presser having combined with it an auxiliary presser-foot by means of a projection extending horizontally from the latter at a right angle to it and into a groove in the body of the presser and secured therein by a screw, all being as shown in the United States Patent No. 230,580.

What I claim as my invention is as follows:

1. The presser-foot B, provided with the two vertical extensions $e$ $e$, in combination with the body A, having in it the two vertical sockets to receive such extensions, and also having clamping-screws to confine the extensions in the sockets.

2. The presser-foot B, provided with the two vertical extensions $e\ e$, in combination with the body A, having in it the two vertical sockets to receive such extensions, and also having to open out of each socket at its lower end a notch, $g$, to receive the foot, each of such sockets being provided with a clamp-screw, and all being substantially as set forth.

HENRY C. STONE.

Witnesses:
R. H. EDDY,
E. B. PRATT.